United States Patent [19]

Watrous

[11] Patent Number: 5,184,407
[45] Date of Patent: Feb. 9, 1993

[54] COMBINATION TOOL AND TAPE FOR MEASURING CIRCUMFERENCE OF FLEXIBLE TUBING

[75] Inventor: Philip J. Watrous, Ledyard, Conn.

[73] Assignee: The United States of America as represented by the Secretary of the Navy, Washington, D.C.

[21] Appl. No.: 897,147

[22] Filed: Jun. 11, 1992

[51] Int. Cl.$^5$ .............................................. G01B 3/10
[52] U.S. Cl. .................................. 33/555.4; 33/561.2; 33/759
[58] Field of Search ............... 33/555.4, 555.1, 561.1, 33/561.2, 755, 759

[56] References Cited

U.S. PATENT DOCUMENTS

| | | | |
|---|---|---|---|
| 1,672,913 | 6/1928 | Schaap | 33/555.4 |
| 1,772,352 | 8/1930 | Huber | 33/555.4 |
| 2,648,913 | 8/1953 | MacKenzie | 33/555.4 |
| 3,967,383 | 7/1976 | Collins | 33/555.4 |
| 4,914,821 | 4/1990 | Hurt | 33/555.4 |
| 4,920,659 | 5/1990 | Becher | 33/555.4 |

Primary Examiner—William A. Cuchlinski, Jr.
Assistant Examiner—C. W. Fulton
Attorney, Agent, or Firm—Michael J. McGowan; Prithvi C. Lall; Michael F. Oglo

[57] ABSTRACT

A plier-like tool having a resilient spring normally urging the jaws of the tool in an outward direction. One of the jaws is pivotally attached to one end of a flexible measuring tape that has an offset intermediate its length so that when the tape is wrapped around the tubing that is to be measured, the tape will not overlap itself. The other end of the tape has an aperture therein adapted to receive a pin carried by the other jaw of the tool, so that when the tape is wrapped around the tubing and the pin is engaged in the aperture, releasing the manual pressure on the tool will permit the biasing spring to spread the jaws apart, thus snugly wrapping the tape around the tubing. If the tubing size is correct, indicia on the parts of the tape that are in side-by-side relation around the tubing will register or align.

4 Claims, 1 Drawing Sheet

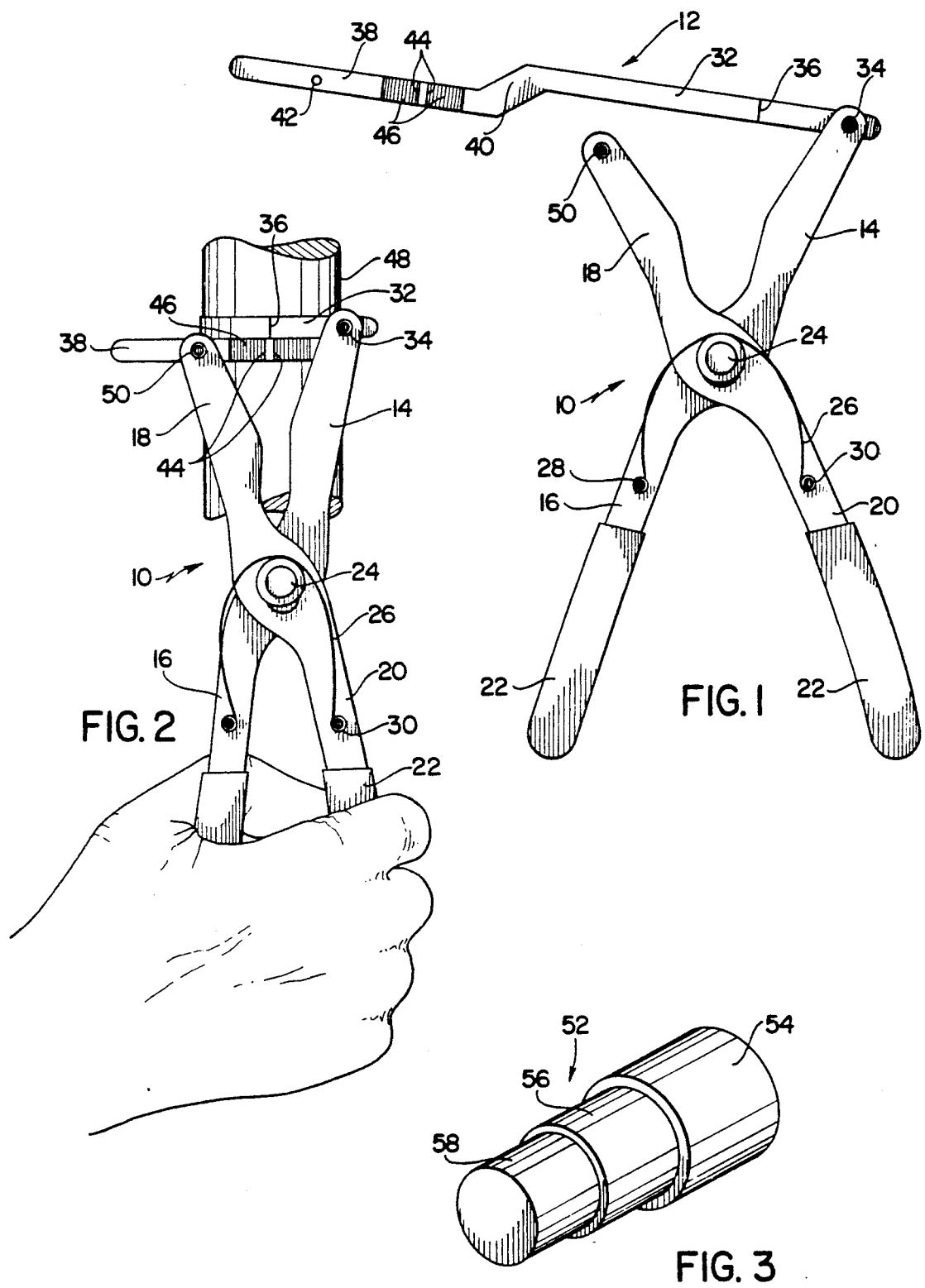

5,184,407

COMBINATION TOOL AND TAPE FOR MEASURING CIRCUMFERENCE OF FLEXIBLE TUBING

The invention described herein may be manufactured and used by or for the Government of the United States of America for governmental purposes without the payment of any royalties thereon or therefor.

BACKGROUND OF THE INVENTION (1) Field of the Invention

This invention relates generally to the measurement of the diameter or circumference of flexible tubing, and is specifically concerned with the provision of means for permitting consistent and accurate measurements to be obtained.

(2) Description of the Prior Art

This invention is particularly concerned with the provision of means for determining whether the diameter or circumference of array fluid-filled tubing meets desired specifications. An array is a flexible fluid-filled hose or tubing of special construction which because of its handling, is very rarely round or concentric. Because of this, measurement of such tubing is limited to measuring the circumference, which is conventionally done by wrapping a so-called Pi tape around the tubing, said tape having Vernier scales which provide the required reading in order that one may determine whether the tubing is of the desired diameter and circumference. However, this operation is somewhat difficult to perform, requiring both hands of the operator, and it has been found that accurate readings are difficult to obtain, particularly under adverse ambient conditions where the light is poor, etc. In addition, since the tube is flexible and usually not round, the amount of tension applied to the tape when wrapping it around the tubing will be a determining factor in the reading that is obtained, to the extent that when different persons measure the same tube, a variation in measurements frequently results.

It is therefore a primary object of this invention to provide a tool and measuring tape which combine to provide accurate and consistent readings when array fluid-filled tubing is measured.

Another object is the provision of a tool which causes the measuring tape to wrap around the tubing that is to be measured with a predetermined tension, so that the tape conforms to somewhat irregular-shaped tubing, while at the same time not compressing the tubing.

Another object is the provision of a measuring tape having calibrating indicia thereon which is extremely easy to read, even by persons unfamiliar with the Vernier scales of standard Pi tapes, even where the measurement is taking place under low light or otherwise adverse conditions.

A still further object is the provision of a tool and tape of the character described wherein the measuring procedure may be performed by the operator, basically using only one hand.

Still another object is the provision of a tool and measuring tape of the character described that is relatively simple and uncomplicated from a structural standpoint, easily and economically feasible to manufacture, durable and long lasting in use, and easy to use even by unskilled operators.

SUMMARY OF THE INVENTION

The objectives of this invention are accomplished by providing a relatively simple plier-like tool having a pair of jaws that are normally biased in an outward direction, and having handle portions which may be manually compressed to move the jaws toward each other against the action of said biasing means. One of the jaws is pivotally attached to one end of a specially designed measuring tape, which tape has an offset so that when the tape is wrapped around the tubing that is to be measured, the tape will not overlap itself, but rather portions of the tape will be positioned in closely adjacent side-by-side relation. The other jaw of the tool has means for releasably engaging the opposite end portion of the tape, whereupon when the tape is wrapped around the tubing that is to be measured, and said other jaw is engaged with the tape at the other end, a releasing of manual pressure on the tool handles will permit the handles and jaws to spread apart pursuant to the biasing means, whereupon the tape will snugly surround and engage the tubing as determined by the predetermined tension of the biasing means. In order to determine whether the tubing is of the proper diameter, one of the side-by-side portions of the tape has an axially extending line thereon, while the other side-by-side portion has a pair of spaced parallel axial lines, the spacing between said parallel lines defining the permissible diameter tolerance. Thus, if the single line on one side-by-side portion of the tape registers or aligns between the two parallel lines on the other side-by-side portion, then the circumference of the tubing is within permissible limits. Obviously, the measuring tape and the location of the measuring lines thereon is pre-designed for a particular size of tubing, whereby use of the tool and tape as aforesaid readily permits even an unskilled operator to quickly determine whether the tubing has the required diameter and circumference, even where poor lighting and other adverse ambient conditions exist.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 is an elevational view illustrating the tool and measuring tape of the present invention, with the tool in its open unstressed position, and with the measuring tape shown in extended position;

FIG. 2 is an elevational view showing the tool and tape of FIG. 1 after the tape has been wrapped around the tubing that is to be measured, and releasably engaged with the left hand jaw of the tool; and FIG. 3 is a calibration plug used to check the accuracy of the measuring tape.

DESCRIPTION OF THE PREFERRED EMBODIMENTS

Referring to the drawings, and particularly to FIG. 1, a plier-like tool is shown generally at 10, and a specially designed measuring tape is shown generally at 12. The tool 10 comprises a first jaw 14 that is an extension of handle portion 16 and a second jaw 18 that is an extension of handle portion 20. Rubber-like grips 22 cover handle portions 16, 20 to permit better gripping of said handle portions, and jaws 14, 18 are pivotally interconnected as at 24 whereby squeezing the handle portions 16, 20 toward each other causes the jaws 14, 18 to move toward each other in a scissors-like action. A wire spring 26 encircles pivot point 24 and has its ends connected to pins 28, 30 mounted on handle portion 16, 20, respectively. Spring 26 tensions tool 10 so that the jaws 14, 18 thereof are normally biased outwardly with respect to each other to the position illustrated in FIG. 1, and it has been found that utilizing a spring that exerts approximately 22 to 24 oz. of tension is preferable for reasons hereinafter to be described in more detail. The tool 10 may be constructed of any structurally strong material such as metal or plastic.

The measuring tape 12, which is preferably constructed of 0.001 in. thick feeler gauge material, comprises a first elongated portion 32 pivotally interconnected adjacent its terminal end, as at 34, to jaw 14 of tool 10. A witness mark, or gauge line 36, is provided on portion 32 of tape 12 at a predetermined position thereon. The tape 12 comprises a second elongated portion 38 which is interconnected to portion 32 by offset 40 whereupon, when the tape is wrapped around a tube that is to be measured, the tape will not overlap itself, but rather the offset causes parts of extended portions 32, 38 to extend around the tube in adjacent side-by-side relation, as illustrated in FIG. 2. Actually, offset measuring tapes are not new per se, such a measuring tape being generally shown in Schapp U.S. Pat. No. 1,672,913 dated Jun. 12, 1928. However, the tape 12 of the instant invention differs significantly from the tape shown in the Schapp Patent in other respects, and Schapp is completely devoid of any suggestion or teaching of using a special tool for applying the measuring tape to the tubing that is to be measured.

Extended portion 38 of tape 12 further comprises an aperture 42 spaced somewhat from the adjacent end of the tape, the purpose of which will hereinafter become apparent. Extended portion 38 is further provided with a pair of spaced parallel gauge lines 44, the distance between said lines defining the permissible diameter tolerance of the tubing to be measured. Darkened portions 46 serve to visually accentuate the gauge lines 44. As will be noted in FIG. 1, jaw 14 is somewhat longer than jaw 18, which compensates for the offset in tape 12 when the latter is wrapped around the tubing that is to be measured, as illustrated in FIG. 2.

In application and use, and with the tool 10 and tape 12 in the position illustrated in FIG. 1, the tape 12 is wrapped around the tubing 48 that is to be measured, as illustrated in FIG. 2, and then the handle portions of the tool are manually squeezed so that a pin member 50 mounted adjacent the terminal end of jaw 18 is aligned with and inserted through aperture 42, after which manual pressure on the handle portions of the tool is released so that spring 26 takes over and spreads the jaws apart until the tape snugly encircles tubing 48. By pre-calibrating the tension of spring 26, and as previously stated 22 to 24 oz. of tension has been found to be preferable, the tape 12, due also to the flexibility of the tape itself, conforms to any irregularity in the circumference of tubing 48 and engages same snugly but with insufficient pressure to compress the tubing at all, which obviously would distort the reading being obtained. If the tubing 48 is of the proper diameter, the witness mark or calibration line 36 will be positioned in registry with or somewhere between the calibration lines 44. If the diameter of the tubing is 100% accurate, then the line 36 will register halfway between the lines 44, but since the spacing between lines 44 represents the permissible diameter tolerance, so long as line 36 is anywhere between the lines 44 the diameter of tubing 48 is acceptable.

As will be seen, the tool 10 can pretty much be manipulated by one hand after pin 50 has been inserted through aperture 42, and reading the tape is extremely simple and can be done by unskilled personnel under adverse conditions such as poor lighting, etc. Since the measuring tape will always be wrapped around the tubing at the same tension, as determined by the tension of spring 26, where measurements are made by different personnel, the results will always be consistent because the tool, not the personnel, determines the tension at which the tape is wrapped around the tubing. Of course, the linear distance between calibration line 36 and calibration lines 44 is predetermined so as to provide proper measurement for a given size tubing.

FIG. 3 illustrates a calibation or testing plug 52 that may be used to check the accuracy of measuring tape 12. As will be noted, plug 52 has a maximum diameter 54 at one extremity, an intermediate diameter 56, and a minimum diameter 58. In use, plug 52 is used in lieu of tubing 48 with the maximum diameter 54 representing the largest permissible diameter for tube 48; intermediate section 56 representing the precise desired diameter of tube 48; and minimum section 58 representing the smallest permissible diameter of tube 48. Thus, the plug 52 may be used at any time to check the accuracy of measuring tape 12, simply by applying the tape to the various diameters by using tool 10, just as though actual tubing was being measured.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A measuring device for tubing comprising in combination;

a tool having pivotally attached jaws having handle portions which when pressed toward each other cause the jaws to move toward each other in a scissors-like action;

resilient means carried by said tool normally urging said jaws in an outward direction;

a flexible measuring tape having an offset intermediate its length, means pivotally connecting one of said jaws to a point adjacent one end of said tape; and cooperating means on said other jaw and on said tape near the other end of the latter for permitting releasable engagement between said other jaw and said tape other end, whereby when the tape is wrapped around the tubing to be measured, said offset permits the tape to engage the tubing without overlapping and with portions of the tape in side-by-side relation, and so that when said other jaw is caused to make engagement with said tape other end and pressure on said handle portions is released, said resilient means causes said jaws to move outwardly to cause said tape to snugly encircle the tubing, and indicia means on the side-byside portions of said tape, which when aligned signify that the tubing is of the proper desired diameter.

2. The device of claim 1, wherein said cooperating means comprises a pin on said other jaw, and an aperture in said tape other end.

3. The device of claim 1, wherein said one jaw being longer than said other jaw.

4. The device of claim 1, wherein said indicia comprises an axially extending line on one of said side-by-side portions, and a pair of spaced parallel axially extending lines on the other of said side-by-side portions, the spacing between said parallel lines defining the permissible diameter tolerance.

* * * * *